United States Patent
Mukaiyama

(10) Patent No.: US 11,972,686 B2
(45) Date of Patent: Apr. 30, 2024

(54) PARKING CONTROL DEVICE

(71) Applicant: TOYOTA JIDOSHA KABUSHIKI KAISHA, Toyota (JP)

(72) Inventor: Yoshio Mukaiyama, Mishima (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 490 days.

(21) Appl. No.: 16/839,615

(22) Filed: Apr. 3, 2020

(65) Prior Publication Data
US 2020/0388155 A1 Dec. 10, 2020

(30) Foreign Application Priority Data

Jun. 7, 2019 (JP) .................................. 2019-107356

(51) Int. Cl.
| | |
|---|---|
| G08G 1/14 | (2006.01) |
| B60W 30/06 | (2006.01) |
| G06Q 10/02 | (2012.01) |
| G06Q 50/30 | (2012.01) |

(52) U.S. Cl.
CPC .............. G08G 1/149 (2013.01); B60W 30/06 (2013.01); G06Q 10/02 (2013.01); G06Q 50/30 (2013.01)

(58) Field of Classification Search
CPC ........ G08G 1/149; B60W 30/06; G06Q 10/02
USPC ........................................................ 701/25
See application file for complete search history.

(56) References Cited

U.S. PATENT DOCUMENTS

| | | | | |
|---|---|---|---|---|
| 2014/0089016 A1* | 3/2014 | Smullin | ................. | G06Q 10/02 705/5 |
| 2014/0350855 A1* | 11/2014 | Vishnuvajhala | ......... | G07C 1/30 701/538 |
| 2018/0137441 A1* | 5/2018 | Wu | ..................... | G06Q 10/0631 |
| 2018/0215376 A1* | 8/2018 | Kuhara | ................. | B60W 30/00 |

(Continued)

FOREIGN PATENT DOCUMENTS

| | | | | |
|---|---|---|---|---|
| CN | 108492551 | * | 5/2018 | ............... G08G 1/00 |
| CN | 108372858 A | | 8/2018 | |

(Continued)

OTHER PUBLICATIONS

Veatch et al., Feeding the Bottleneck, Journal of Humanitarian Logistics and Supply Chain Management, 8,4 p. 430-446 (2018) (Year: 2018).*

(Continued)

*Primary Examiner* — Jeff Zimmerman
*Assistant Examiner* — Mark C Clare
(74) *Attorney, Agent, or Firm* — Sughrue Mion, PLLC

(57) ABSTRACT

A parking control device performs parking control such that a vehicle is parked in a reserved parking area in an automatic valet parking lot including a plurality of parking areas. When the vehicle arrives at the automatic valet parking lot before an entrance time for the reserved parking area, the parking control device determines whether the reserved parking area is available. When it is determined that the reserved parking area is not available, the parking control device determines whether a temporary parking area which is an area other than the reserved parking area is available. When it is determined that the temporary parking area is available, the parking control device performs parking control such that the vehicle is parked in the temporary parking area.

8 Claims, 8 Drawing Sheets

(56) References Cited

U.S. PATENT DOCUMENTS

| | | | |
|---|---|---|---|
| 2018/0300673 A1* | 10/2018 | Wappler | G01S 13/751 |
| 2018/0350157 A1 | 12/2018 | Koreishi et al. | |
| 2018/0357906 A1* | 12/2018 | Yaldo | G08G 1/202 |
| 2019/0066502 A1* | 2/2019 | Du | G08G 1/142 |
| 2020/0272950 A1* | 8/2020 | Xu | G06Q 30/0185 |
| 2020/0311849 A1 | 10/2020 | Noguchi et al. | |

FOREIGN PATENT DOCUMENTS

| | | | | |
|---|---|---|---|---|
| CN | 108986525 A | | 12/2018 | |
| CN | 109017764 A | | 12/2018 | |
| JP | 11-25393 A | | 1/1999 | |
| JP | 2000-99895 A | | 4/2000 | |
| JP | 2015153145 | * | 2/2014 | G01C 21/34 |
| JP | 2015-075899 A | | 4/2015 | |
| JP | 2015-153145 A | | 8/2015 | |
| JP | 2018-205852 A | | 12/2018 | |
| JP | 2020-166710 A | | 10/2020 | |

OTHER PUBLICATIONS

Office Action dated Jun. 6, 2023 by the United States Patent and Trademark Office in U.S. Appl. No. 18/065,011.

Office Action dated Oct. 16, 2023 by the United States Patent and Trademark Office in U.S. Appl. No. 18/065,011.

Advisory Action issued in U.S. Appl. No. 18/065,011 dated Jan. 25, 2024.

Notice of Allowance issued in U.S. Appl. No. 18/065,011 dated Feb. 22, 2024.

\* cited by examiner

PARKING CONTROL DEVICE

INCORPORATION BY REFERENCE

The disclosure of Japanese Patent Application No. 2019-107356 filed on Jun. 7, 2019 including the specification, drawings and abstract is incorporated herein by reference in its entirety.

BACKGROUND

1. Technical Field

The present disclosure relates to a parking control device.

2. Description of Related Art

Japanese Patent Application Publication No. 2015-075899 (JP 2015-075899 A) discloses a parking control device that performs parking control such that a vehicle is parked in a parking area for which an entrance time has been reserved in a parking lot including a plurality of parking areas in which vehicles park.

SUMMARY

In the parking control device described above, when a vehicle arrives at the parking lot before the reserved entrance time, the vehicle cannot park and is caused to wait until the entrance time.

The disclosure provides a parking control device that can prevent a vehicle from being caused to wait without being able to park until a reserved entrance time.

According to an aspect of the disclosure, there is provided a parking control device that performs parking control such that a vehicle is parked in a reserved parking area which is a parking area for which an entrance time has been reserved in a parking lot including a plurality of parking areas, wherein the parking control device determines whether the reserved parking area is available when the vehicle arrives at the parking lot before the entrance time reserved for the reserved parking area, determines whether a temporary parking area which is an area other than the reserved parking area is available when it is determined that the reserved parking area is not available, and performs parking control such that the vehicle is parked in the temporary parking area when the temporary parking area is available.

In this parking control device, a vehicle which has arrived at a parking lot before a reserved entrance time and which cannot be parked in a reserved parking area can be parked in a temporary parking area when the temporary parking area is available. Accordingly, it is possible to prevent a vehicle from being caused to wait without being able to park until a reserved entrance time.

In one embodiment, the temporary parking area may be a parking area for which an entrance time is set to be reservable in the parking lot. With this configuration, it is possible to use a parking area for which an entrance time is set to be reservable in the parking lot as a temporary parking area.

In one embodiment, the parking control device may determine whether another temporary parking area which is a parking area other than the reserved parking area and the temporary parking area is available when the reserved parking area is not available and another vehicle having reserved an entrance time for the temporary parking area arrives at the parking lot after the vehicle has been parked in the temporary parking area, and perform parking control such that the vehicle moves to the other temporary parking area when it is determined that the other temporary parking area is available. With this configuration, it is possible to prevent interference with parking of another vehicle in a parking area which is used as the temporary parking area.

In one embodiment, the parking control device may set an entrance time for a parking area for which the entrance time is set to be reservable in the parking lot and which has not been reserved to be reservable when at least one of conditions (1) to (3) is satisfied while the parking area is set as the temporary parking area. With this configuration, it is possible to reserve an entrance time for a parking area even when the parking area is used as the temporary parking area. The conditions may include (1) a condition that another parking area for which an entrance time is set to be reservable in the parking lot has not been reserved; (2) a condition that another parking area for which an entrance time is not set to be reservable in the parking lot is available; and (3) a condition that all of a plurality of other parking areas for which an entrance time is set to be reservable in the parking lot has been reserved and a time period from a current time to an earliest time of exit times which are reserved for the plurality of other parking areas is less than a predetermined time.

In one embodiment, the temporary parking area may be an area for which an entrance time is not set to be reservable in the parking lot. With this configuration, it is possible to use an area such as a dead space for which an entrance time is not set to be reservable in the parking lot as a temporary parking area.

In one embodiment, the parking control device may set a parking area for which an entrance time is set to be reservable in the parking lot as the temporary parking area when the parking area for which an entrance time is set to be reservable in the parking lot is available, and set an area for which an entrance time is not set to be reservable in the parking lot as the temporary parking area when a parking area for which an entrance time is set to be reservable in the parking lot is not available and the area for which an entrance time is not set to be reservable in the parking lot is available. With this configuration, it is possible to preferentially use a parking area for which an entrance time is set to be reservable as a temporary parking area. It is possible to secure an area such as a dead space for which an entrance time is not set to be reservable in the parking lot, for example, as an emergency refuge area.

In one embodiment, the parking control device may set an area for which an entrance time is not set to be reservable in the parking lot as the temporary parking area when the area for which an entrance time is not set to be reservable in the parking lot is available, and set a parking area for which an entrance time is set to be reservable in the parking lot as the temporary parking area when the area for which an entrance time is not set to be reservable in the parking lot is not available and the parking area for which an entrance time is set to be reservable in the parking lot is available. With this configuration, it is possible to preferentially use an area such as a dead space for which an entrance time is not set to be reservable in the parking lot as a temporary parking area. It is possible to secure a parking area for which an entrance time is set to be reservable as a parking area for parking another vehicle.

In one embodiment, the parking control device may determine whether the reserved parking area is available after the vehicle has been parked in the temporary parking area, and perform parking control such that the vehicle moves from the temporary parking area to the reserved parking area when it is determined that the reserved parking area is available. With this configuration, for example, in comparison with a case in which a reserved parking area which becomes available is used as a temporary parking area of another vehicle, it is possible to prevent frequent movement of the vehicle or the other vehicle and to perform efficient parking control.

In one embodiment, the parking control device may be able to perform parking control such that the vehicle is parked in the temporary parking area when the vehicle arrives at the parking lot before the entrance time reserved for the reserved parking area and a different time between an arrival time at which the vehicle arrives at the parking lot and the entrance time is equal to or less than a predetermined time. With this configuration, it is possible to prevent a vehicle from being able to park in the parking lot regardless of a reserved entrance time.

According to various aspects and embodiments of the disclosure, it is possible to prevent a vehicle from being caused to wait without being able to park until a reserved entrance time.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an exemplary embodiment will be described with reference to the accompanying drawings. In the following description, the same or corresponding elements will be referred to by the same reference signs and description thereof will not be repeated.

Figure 1:
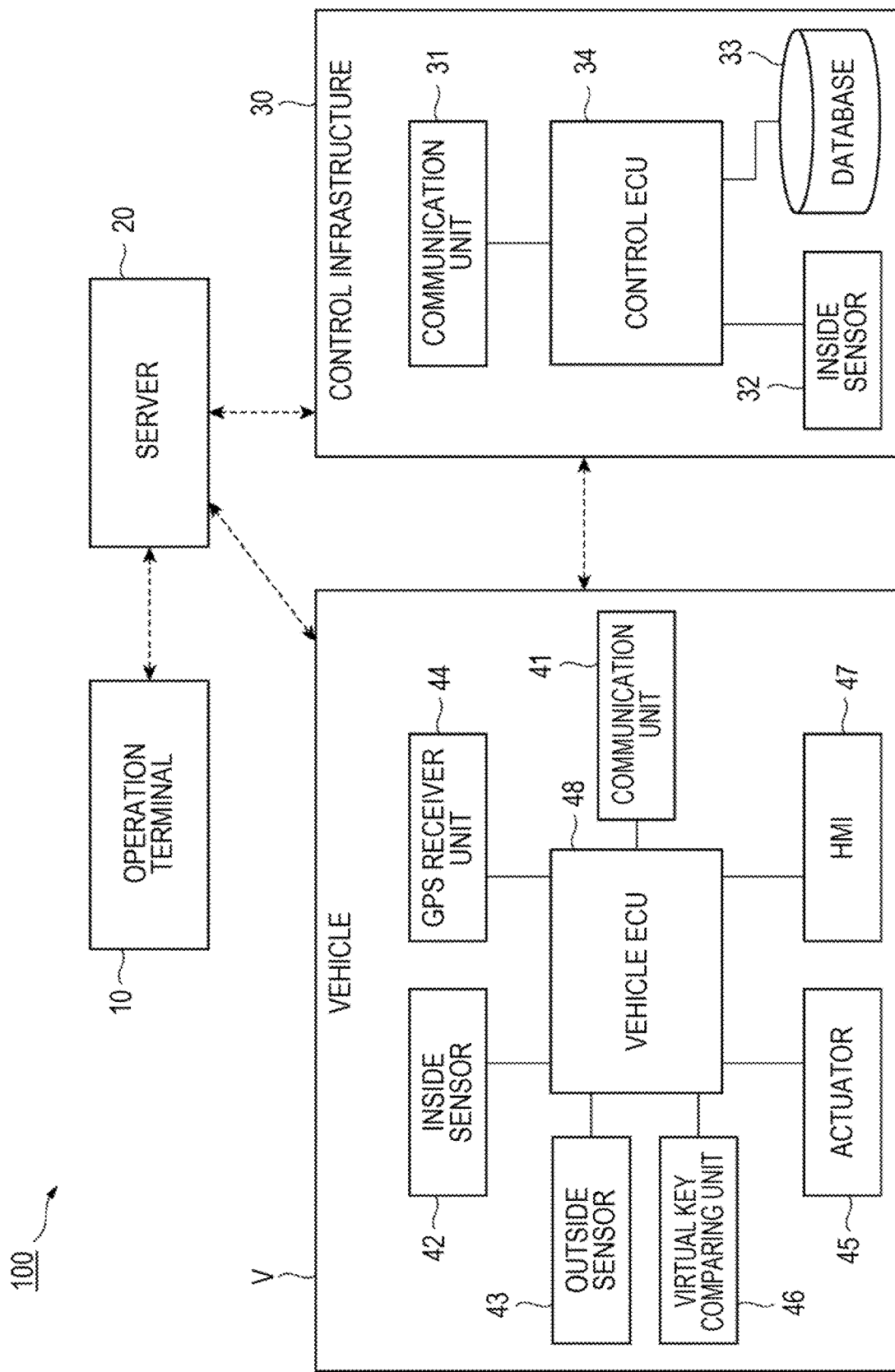
FIG. 1 is a diagram schematically illustrating a configuration of a parking control device according to an embodiment.
Figure 2:
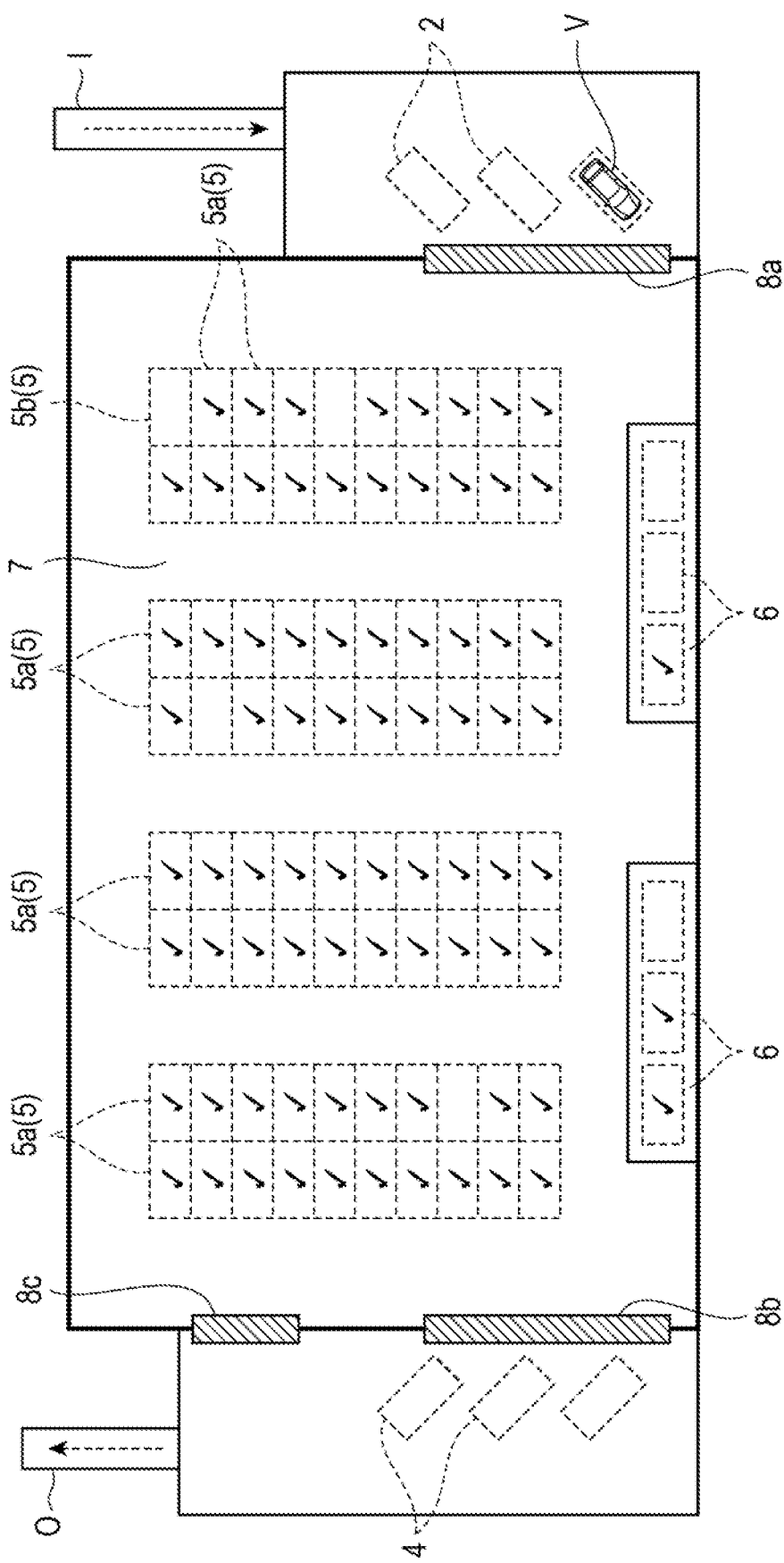
FIG. 2 is a diagram schematically illustrating an automatic valet parking lot 1 to which the parking control device is applied.

FIG. 1 is a diagram schematically illustrating a configuration of a parking control device 100 according to an embodiment. FIG. 2 is a diagram schematically illustrating an automatic valet parking lot 1 to which the parking control device 100 is applied. As illustrated in FIGS. 1 and 2, the parking control device 100 is a device that is applied to an automatic valet parking lot 1 which is a parking lot in which so-called automatic valet parking is realized. Automatic valet parking will be first described below with reference to FIG. 2.

In automatic valet parking, for example, a vehicle V is automatically parked in a predetermined area in the automatic valet parking lot 1 after an occupant has alighted from the vehicle V in an alighting area 2 of the automatic valet parking lot 1, and the vehicle V is caused to travel automatically to a boarding area 4 at a time at which the occupant boards the vehicle. The automatic valet parking lot 1 includes a plurality of parking areas 5 and a plurality of temporary holding areas 6. The parking areas 5 and the temporary holding areas 6 are areas which are located in a range defined by white lines in the parking lot, each of which includes a space in which a vehicle V can be parked, and which are arranged in a layout in which a vehicle V can be parked.

The plurality of parking areas 5 includes reservable parking areas 5a which are parking areas for which an entrance time is set to be reservable in the automatic valet parking lot 1 and unreservable parking areas 5b which are parking areas for which an entrance time is set to be unreservable in the automatic valet parking lot 1. The plurality of temporary holding areas 6 is areas for which an entrance time is not set to be reservable in the automatic valet parking lot 1. The plurality of temporary holding areas 6 is areas which are formed using dead spaces in the automatic valet parking lot 1. In the automatic valet parking lot 1, setting of whether an entrance time is reservable can be appropriately changed, for example, depending on a time period.

In the automatic valet parking lot 1, a traveling route 7 on which a vehicle V can travel is provided. In the automatic valet parking lot 1, structures such as screen walls or posts may be provided. In the automatic valet parking lot 1, an entrance I through which a vehicle V enters, an exit O through which a vehicle V exits, an alighting area 2 in which an occupant alights from a vehicle, a boarding area 4 in which an occupant boards a vehicle, an entrance gate 8a which is a gate for when a vehicle V travels from the alighting area 2 to a parking area 5, an exit gate 8b which is a gate for when a vehicle V travels from a parking area 5 to the boarding area 4, and a return gate 8c which is a gate for when a vehicle V returns from the boarding area 4 to a parking area 5 are provided.

In automatic valet parking, an occupant of a vehicle V alights from the vehicle in the alighting area 2 of the automatic valet parking lot 1. The occupant of the vehicle V may be a driver of the vehicle V. The vehicle V enters a reserved parking area 5c (the drawing) which is a parking area for which an entrance time has been reserved by automated driving control. At the time of exit, the vehicle V moves from the reserved parking area 5c in which the vehicle V has been parked to the boarding area 4 by automated driving control. Then, the occupant boards the vehicle in the boarding area 4.

The automatic valet parking lot 1 according to this embodiment may include all areas to which a vehicle V can move for automatic valet parking. For example, an alighting area in which an occupant alights from a vehicle V in automatic valet parking may be located on a traveling route in front of a front door of a hotel and a position of a reserved parking area 5c in which a vehicle V is parked by automated driving control may be located away from the front door of the hotel. In this case, the automatic valet parking lot 1 includes a traveling route on which a vehicle V travels from the front door of the hotel (an alighting position) to the position of the reserved parking area 5c by automated driving control.

Automated driving control is control for causing a vehicle V to travel in a state in which intervention by a driver is not performed. In automated driving control, a vehicle V in the automatic valet parking lot 1 is caused to travel from a current position to a preset target position in the automatic valet parking lot 1. A current position is a start position of automated driving control and is, for example, the alighting position or a position at which a vehicle V is currently parked. A target position is an end position of automated driving control and is, for example, the reserved parking area 5c or the boarding area 4. The target position includes a temporary parking area which will be described later. Parking control is control for causing a vehicle V to park by automated driving control in a state in which intervention by a driver is not performed (automatic parking). In FIG. 2, "˜" in the parking areas 5 represents that other vehicles are parked (the same is true of FIGS. 5, 6, and 7).

The parking control device 100 is a device that performs parking control for parking a vehicle V in a reserved parking area 5c. As illustrated in FIG. 1, the parking control device 100 includes an operation terminal 10, a server 20, and a control infrastructure 30. The operation terminal 10 constitutes, for example, a human-machine interface (HMI) which is an interface for performing input and output of information with an occupant. The operation terminal 10 communicates with the server 20 by long-range communication. The operation terminal 10 receives an operation input associated with reservations of an entrance time and an exit time. The operation terminal 10 transmits information on reservations of an entrance time and an exit time (hereinafter also simply referred to as "reservation information") to the server 20.

The operation terminal 10 displays information transmitted from the server 20 on whether a reservation is possible. The operation terminal 10 receives an operation input associated with completion of a final check. The operation terminal 10 transmits information indicating that the final check has been completed to the server 20. The operation terminal 10 receives, for example, an operation input for starting entrance of a vehicle V from which an occupant has alighted in the alighting area 2. The operation terminal 10 transmits information for starting entrance of the vehicle V to the server 20. The operation terminal 10 receives, for example, an operation input for starting exit of a vehicle V parked in a reserved parking area 5c. The operation terminal 10 transmits information for starting exit of a vehicle V to the server 20. For example, a smartphone or a tablet is used as the operation terminal 10.

The server 20 communicates with the control infrastructure 30 and a vehicle V by long-range communication. The server 20 manages a status of reservation (hereinafter simply referred to as a "reservation status") of parking (an entrance time) in the automatic valet parking lot 1. When reservation information of a vehicle V is transmitted from an operation terminal 10, the server 20 determines whether a reservation for parking of the vehicle V is possible based on the reservation information and a reservation status which is managed. The server 20 transmits information on the result of determination of whether a parking reservation is possible to the operation terminal 10. When the parking reservation for the vehicle V is possible and information indicating that the final check has been completed is transmitted from the operation terminal 10, the server 20 determines an entrance time and an exit time associated with the reservation information and determines a reservable parking area 5a associated with the reservation information as a reserved parking area 5c. The server 20 updates the reservation status which is managed based on the determined reservation information and the reserved parking area 5c. The reservation status includes, for example, information in which the reservation information and the reserved parking area 5c corresponding to the reservation information are correlated with one or more vehicles V which are to be reserved.

When reservation information of a vehicle V having arrived at the automatic valet parking lot 1 is requested by the control infrastructure 30, the server 20 transmits the reservation information of the vehicle V and the reserved parking area 5c to the control infrastructure 30 based on the managed reservation status.

The server 20 manages virtual keys of a plurality of vehicles V. Information on the virtual keys of the plurality of vehicles V may be registered in advance in the server 20, for example, by a provider that provides the automatic valet parking lot 1. When information for starting entrance of a vehicle V is received from the operation terminal 10, the server 20 transmits the received information along with the information on the virtual key of the vehicle V to the vehicle V. When information for starting exit of a vehicle V is received from the operation terminal 10, the server 20 transmits the received information along with the information on the virtual key of the vehicle V to the vehicle V. A technique associated with a virtual key is not particularly limited and various known techniques can be used.

The control infrastructure 30 is provided for the automatic valet parking lot 1. The control infrastructure 30 includes a communication unit 31, an inside sensor 32, a database 33, and a control electronic control unit (ECU) 34. The communication unit 31 communicates with the server 20 by long-range communication. The communication unit 31 communicates with vehicles V by road-to-vehicle communication. The communication unit 31 inputs and outputs various signals to and from the control ECU 34.

The inside sensor 32 includes a plurality of image sensors (cameras) and a plurality of infrared sensors. The plurality of image sensors images the alighting areas 2, the boarding areas 4, the parking areas 5, the temporary holding areas 6, and the traveling routes 7. The plurality of infrared sensors detects parking of a vehicle V in the alighting areas 2, the boarding areas 4, the parking areas 5, the temporary holding areas 6, and the traveling routes 7. The inside sensor 32 outputs the results of detection to the control ECU 34. The database 33 stores, for example, map data of the automatic valet parking lot 1 (data indicating locations of the parking areas 5, the temporary holding areas 6, the traveling routes 7, and the like). The database 33 is configured to be referred to by the control ECU 34. The database 33 may store a use history of each of a plurality of vehicles V (information on the traveling routes or the like).

The control ECU 34 is an electronic control unit including a central processing unit (CPU), a read only memory (ROM), and a random access memory (RAM). For example, the control ECU 34 operates a CAN communication circuit to input and output data based on signals output from the CPU, stores data in the RAM, and realizes various functions by loading a program stored in the ROM into the RAM and executing the program loaded into the RAM. The control ECU 34 may include a plurality of electronic control units.

The control ECU 34 recognizes a parking status of the automatic valet parking lot 1 based on at least one of the result of detection detected by the inside sensor 32 and a reservation status managed by the server 20. The parking status of the automatic valet parking lot 1 includes, for example, information on reservable parking areas 5a for which an entrance time has not been reserved (availability information). The parking status of the automatic valet parking lot 1 includes, for example, information on reserved parking areas 5c and entrance times and exit times therefor. The parking status of the automatic valet parking lot 1 includes, for example, information on one or more parking areas 5 in which a vehicle V is parked. The parking status of the automatic valet parking lot 1 includes, for example, information on one or more temporary holding areas 6 in which a vehicle V is parked.

The control ECU 34 recognizes a vehicle V which arrives in the alighting area 2 of the automatic valet parking lot 1 based on the result of detection detected by the inside sensor 32. The control ECU 34 recognizes a vehicle V and a number of the number plate of the vehicle V, for example, based on an image captured by an image sensor included in the inside sensor 32. That is, as recognition of a vehicle V arriving at the automatic valet parking lot 1, the control ECU 34 recognizes the presence of a vehicle V which arrives at the automatic valet parking lot 1 and identification information for identifying the vehicle V. For example, the control ECU 34 may recognize a vehicle V based on information which is input by an occupant's operation of a ticket machine that issues a parking ticket. For example, the control ECU 34 may recognize a vehicle V by reading an individual parking card or a two-dimensional code which is carried by an occupant using a reader of the control infrastructure 30.

The control ECU 34 requests reservation information for the recognized vehicle V and information on a reserved parking area 5c to the server 20 via the communication unit 31. The control ECU 34 receives the reservation information for the recognized vehicle V and the information on the reserved parking area 5c from the server 20 via the communication unit 31.

The control ECU 34 generates routes of the vehicle V at the time of entrance and exit based on the reservation information for the recognized vehicle V, the reserved parking area 5c, and the map data of the automatic valet parking lot 1. The routes include, for example, an entrance route which is a course of the traveling route 7 from the alighting area 2 to the reserved parking area 5c and an exit route which is a course of the traveling route 7 from the reserved parking area 5c to the boarding area. The control ECU 34 may adjust the routes based on the use history of the vehicle V stored in the database 33. The control ECU 34 transmits the map data stored in the database 33 and information on the generated routes to the vehicle V via the communication unit 31.

The parking control device 100 includes a communication unit 41, an inside sensor 42, an outside sensor 43, a GPS receiver unit 44, an actuator 45, a virtual key comparing unit 46, an HMI 47, and a vehicle ECU 48 in the vehicle V.

The communication unit 41 communicates with the server 20 by long-range communication. The communication unit 41 communicates with the communication unit 31 of the control infrastructure 30 by road-to-vehicle communication. The communication unit 41 inputs and outputs various signals to and from the vehicle ECU 48.

The inside sensor 42 is a detector that detects a traveling state of the vehicle V. The inside sensor 42 includes a vehicle speed sensor, an acceleration sensor, and a yaw rate sensor. The vehicle speed sensor is a detector that detects a speed of the vehicle V. For example, a wheel speed sensor that is provided in vehicle wheels of the vehicle V, a drive shaft rotating along with the vehicle wheels, or the like and detects a rotation speed of the vehicle wheels is used as the vehicle speed sensor. The acceleration sensor is a detector that detects the acceleration of the vehicle V. The acceleration sensor may include a longitudinal acceleration sensor that detects the acceleration in the longitudinal direction of the vehicle V and a lateral acceleration sensor that detects the acceleration in the lateral direction of the vehicle V. The yaw rate sensor is a detector that detects a yaw rate (a rotational angular velocity) around a vertical axis at the center of gravity of the vehicle V. For example, a gyro sensor may be used as the yaw rate sensor.

The outside sensor 43 includes a sensor that detects an object (an obstacle, a white line, or the like) near the vehicle V and a sensor that is used to detect whether the vehicle V comes into contact with an obstacle. An obstacle is an object in the automatic valet parking lot 1 such as another vehicle, a screen wall, or a post. The sensor that detects an object near the vehicle V includes, for example, a laser sensor, a millimeter wave sensor, a sonar sensor, or an image sensor.

The GPS receiver unit 44 receives signals from three or more GPS satellites and acquires position information indicating the position of the vehicle V. The position information includes, for example, coordinates (latitude and longitude) in the automatic valet parking lot 1. Another unit that can specify latitude and longitude at which the vehicle V is located may be used instead of the GPS receiver unit 44.

The actuator 45 is a device that performs automated driving control and parking control of the vehicle V. The actuator 45 includes at least an engine actuator, a brake actuator, and a steering actuator. The engine actuator controls a driving force of the vehicle V by changing an amount of air supplied to an engine (for example, changing an amount of operation of a throttle valve) based on a control signal from the vehicle ECU 48. When the vehicle V is a hybrid vehicle or an electric vehicle, the engine actuator controls a driving force of a motor which is a power source.

The virtual key comparing unit 46 compares information on a virtual key which is received from the server 20 via the communication unit 41. The virtual key comparing unit 46 outputs the result of comparison of the virtual key to the vehicle ECU 48. The method of comparing the virtual key in the virtual key comparing unit 46 is not particularly limited and various known methods can be used.

The HMI 47 is an interface that is used to input and output information with a driver. The HMI 47 includes, for example, a touch panel display and a speaker. The HMI 47 performs outputting of an image to the touch panel display and outputting of a sound from the speaker in accordance with a control signal from the vehicle ECU 48. The HMI 47 may include a head-up display (HUD).

The vehicle ECU 48 is an electronic control unit that performs parking control and includes a CPU, a ROM, a RAM, and a controller area network (CAN) communication circuit. For example, the vehicle ECU 48 is connected to a network which performs communication using the CAN communication circuit and is communicatively connected to the above-mentioned elements of the vehicle V. The vehicle ECU 48 operates the CAN communication circuit to input and output data based on a signal output from the CPU, stores data in the RAM, and realizes various functions by loading a program stored in the ROM and executing the program loaded into the RAM. The vehicle ECU 48 may be constituted by a plurality of electronic control units.

The vehicle ECU 48 recognizes an object near the vehicle V based on at least one of the result of detection from the outside sensor 43 and map data transmitted from the control infrastructure 30. The vehicle ECU 48 recognizes an object, for example, when the result of detection is acquired from the outside sensor 43. The vehicle ECU 48 recognizes a traveling state of the vehicle V based on the result of detection from the inside sensor 42. The traveling state of the vehicle V includes, for example, a vehicle speed, the acceleration, and the yaw rate.

The vehicle ECU 48 creates a traveling plan for realizing parking control for parking the vehicle V from the current position to a target position thereof. The vehicle ECU 48 receives information for starting entrance of the vehicle V from the server 20 via the communication unit 41, and creates a traveling plan for realizing parking control for parking the vehicle V in the reserved parking area 5c or a temporary parking area which will be described later when the result of comparison of the virtual key by the virtual key comparing unit 46 is correct. The vehicle ECU 48 receives information for starting exit of the vehicle V from the server 20, and creates a traveling plan for realizing parking control for parking the vehicle V in the boarding area 4 when the result of comparison of the virtual key by the virtual key comparing unit 46 is correct. Creation of a traveling plan can be performed based on the position information of the vehicle V acquired from the GPS receiver unit 44, the recognized traveling state of the vehicle V, the recognized object near the vehicle V, and a route and map data transmitted from the control infrastructure 30. The vehicle ECU 48 outputs a control signal to the actuator 45, for example, such that parking of the vehicle V is controlled in accordance with the created traveling plan.

In this embodiment, the control ECU 34 performs the following processes. It is determined whether a vehicle V of which arrival at the alighting area 2 of the automatic valet parking lot 1 has been recognized has arrived before an entrance time reserved for a reserved parking area 5c (hereinafter also referred to as a "reserved entrance time") reserved for the vehicle V. When it is determined that the vehicle V has arrived before the reserved entrance time (that is, has arrived early), it is determined whether the reserved parking area 5c is available based on the parking status of the automatic valet parking lot 1. For example, when there is no previous reservation for the reserved parking area 5c between the current time to the reserved entrance time and no other vehicle is currently parked in the reserved parking area 5c, it is determined that the reserved parking area 5c is available. Determination of whether the reserved parking area is available is not particularly limited and can be performed using a known method.

When it is determined that the reserved parking area 5c is not available, it is determined whether a temporary parking area which is an area other than the reserved parking area 5c is available. The temporary parking area is one of a reservable parking area 5a and a temporary holding area 6. For example, when another vehicle is not located in the temporary holding area or the reservable parking area 5a which serves as a temporary parking area is not reserved, it is determined that the temporary parking area is available.

When it is determined that the temporary parking area is available, parking control for causing the vehicle V to park in the temporary parking area is performed by the control ECU 34 and the vehicle ECU 48. For example, the control ECU 34 generates a route which is a course of the traveling route 7 from the current position to the temporary parking area. The vehicle ECU 48 creates a traveling plan at the time of temporary parking for performing parking control of the vehicle V from the current position to the temporary parking area. The vehicle ECU 48 outputs a control signal to the actuator 45 such that the vehicle V is subjected to automated driving and parking control in accordance with the traveling plan.

In this embodiment, after the vehicle V has been parked in the temporary parking area which is a reservable parking area 5a, when a reserved parking area 5c is not available and another vehicle which has reserved an entrance time for the temporary parking area has arrived at the automatic valet parking lot 1, the control ECU 34 determines whether another temporary parking area is available. The other temporary parking area is an area other than the reserved parking area 5c and is an area other than the temporary parking area in which the vehicle is current parked. When it is determined that the other temporary parking area is available, the control ECU 34 and the vehicle ECU 48 perform parking control such that the vehicle V moves to another temporary parking area. For example, the control ECU 34 generates a route which is a course of the traveling route 7 from the current position to the other temporary parking area. The vehicle ECU 48 creates a traveling plan at the time of temporary parking such that the vehicle V is subjected to parking control from the current position to the other temporary parking area. The vehicle ECU 48 outputs a control signal to the actuator 45 such that the vehicle V is subjected to parking control in accordance with the traveling plan.

In this embodiment, the server 20 is able to set an entrance time for a reservable parking area 5a which has not been reserved to be reservable when at least one of the following conditions (1) to (3) is satisfied while the reservable parking area 5a is used as a temporary parking area. The current time is a time at which it is determined whether at least one of the following conditions (1) to (3) is satisfied. A predetermined time is set in advance. (1) A condition that another reservable parking area 5a has not been reserved. (2) A condition that a temporary holding area 6 is available. (3) A condition that all of a plurality of other reservable parking areas 5a have been reserved and a time period from the current time to the earliest one of exit times which are reserved for the plurality of other reservable parking areas 5a is less than a predetermined time.

In this embodiment, the control ECU 34 sets a temporary holding area 6 as a temporary parking area when the temporary holding area 6 is available, and sets a reservable parking area 5a as a temporary parking area when the a temporary holding area 6 is not available and the reservable parking area 5a is available.

In this embodiment, the control ECU 34 determines whether the reserved parking area 5c is available after the vehicle V has been parked in the temporary parking area. When it is determined that the reserved parking area 5c is available, the control ECU 34 and the vehicle ECU 48 perform parking control such that the vehicle V moves from the temporary parking area to the reserved parking area 5c.

In this embodiment, when the vehicle V has arrived early, the control ECU 34 calculates a difference time between the arrival time of the vehicle V and the reserved entrance time. When the difference time is equal to or less than a predetermined time, the control ECU 34 and the vehicle ECU 48 can perform the parking control such that the vehicle V is parked in the temporary parking area. When the difference time is greater than the predetermined time, the control ECU 34 and the vehicle ECU 48 do not perform the parking control such that the vehicle V is parked in the temporary parking area but cause the vehicle V to wait outside the automatic valet parking lot 1.

The predetermined time is set in advance. The outside of the automatic valet parking lot 1 is not particularly limited and an example thereof is an available space which is close to the automatic valet parking lot 1. When the vehicle V waits outside the automatic valet parking lot 1, for example, the vehicle ECU 48 performs parking control such that the vehicle V is parked outside the automatic valet parking lot 1 based on map information of a navigation device mounted in the vehicle V.

An example of an operation of the parking control device 100 at the time of entrance of the vehicle V will be described below with reference to FIGS. 3 and 4.

Figure 3:
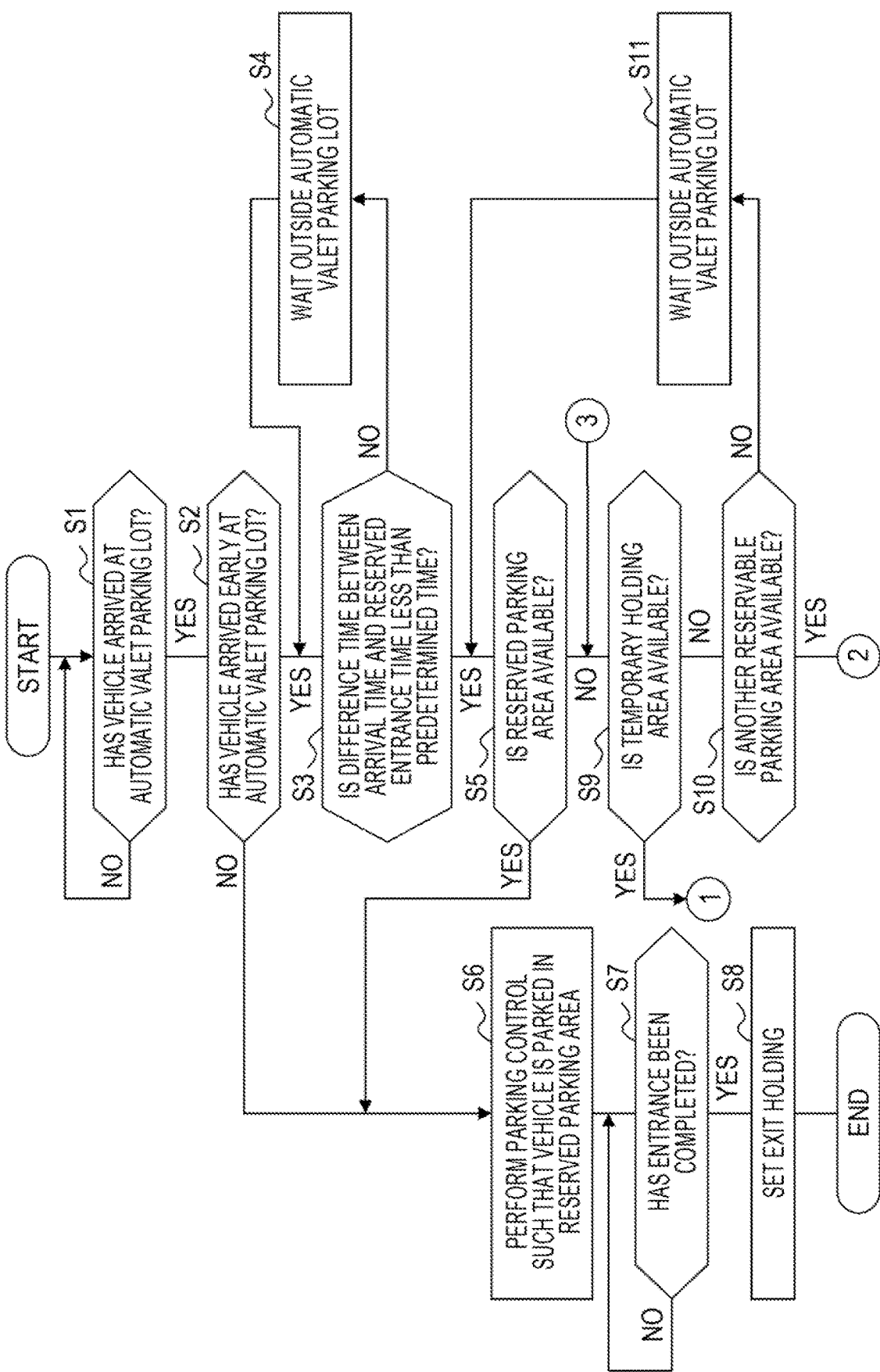
FIG. 3 is a flowchart illustrating a process flow which is performed by the parking control device.
Figure 4:
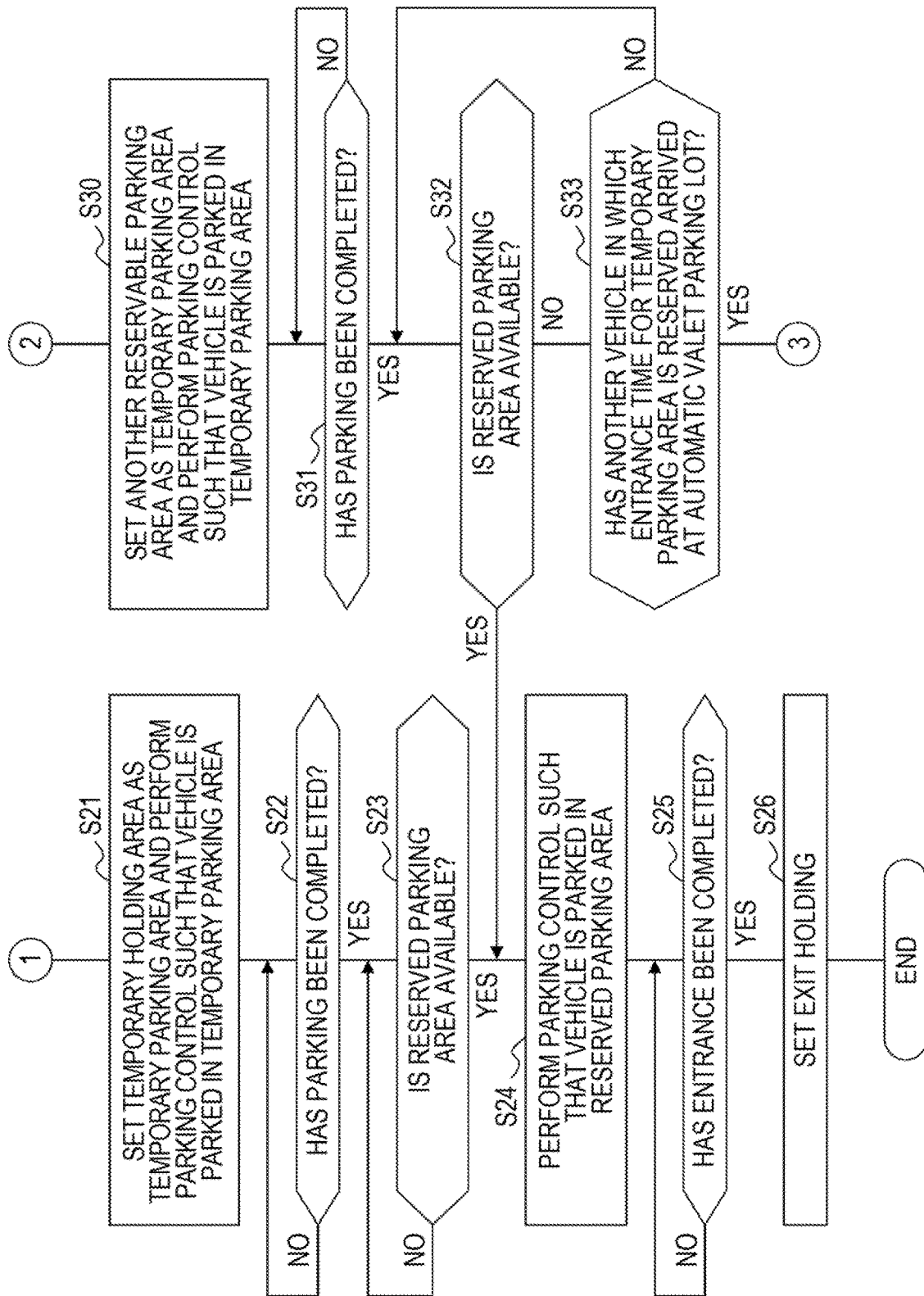
FIG. 4 is a flowchart illustrating a process flow which is performed by the parking control device.

FIGS. 3 and 4 are flowcharts illustrating a process flow which is performed by the parking control device 100. In the following example, it is assumed that an occupant of a vehicle V reserves an entrance time into the automatic valet parking lot 1 and an exit time from the automatic valet parking lot 1 using the operation terminal 10 and reservation information thereof is determined by the server 20.

First, the control ECU 34 determines whether a vehicle V has arrived at the automatic valet parking lot 1 (Step S1). In Step S1, it is determined whether the vehicle V has arrived at the automatic valet parking lot 1 by determining whether the vehicle V having arrived at the alighting area 2 has been recognized based on the result of detection from the inside sensor 32. When the determination result of Step S1 is YES, the control ECU 34 determines whether the arrival of the vehicle V is early (Step S2). In Step S2, the reservation information of the recognized vehicle V is received from the server 20 via the communication unit 31, and it is determined that the arrival of the vehicle V is early when the arrival time of the vehicle V is earlier than the reserved entrance time. When the determination result of Step S1 is NO, it is determined whether the vehicle V has arrived at the automatic valet parking lot 1.

When the determination result of Step S2 is YES, the control ECU 34 determines whether a difference time between the arrival time of the vehicle V and the reserved entrance time is equal to or less than a predetermined time (Step S3). When the determination result of Step S3 is NO, the vehicle ECU 48 performs parking control such that the vehicle V is parked outside the automatic valet parking lot 1, and causes the vehicle V to wait outside the automatic valet parking lot 1 (Step S4). In Step S4, parking control is performed such that the vehicle V is parked outside the automatic valet parking lot 1 based on map information of a navigation device mounted in the vehicle V or the like. After Step S4, the process flow returns to Step S3.

When the determination result of Step S3 is YES, the control ECU 34 determines whether the reserved parking area 5c is available (Step S5). In Step S5, it is determined whether the reserved parking area 5c is available based on the recognized parking status of the automatic valet parking lot 1. When the determination result of Step S5 is YES, the control ECU 34 and the vehicle ECU 48 perform parking control such that the vehicle V is parked in the reserved parking area 5c (Step S6).

After entrance of the vehicle V into the reserved parking area 5c has been completed, the server 20, the control ECU 34, and the vehicle ECU 48 set the vehicle V to exit holding (Steps S7 and S8). Completion of entrance of the vehicle V can be determined, for example, based on the map data of the automatic valet parking lot 1, the position information of the vehicle V, and the result of detection from the inside sensor 32. "Exit holding" is a state in which the vehicle V is paused (an ignition switch is turned off) in a state in which it can communicate with the server 20 and the control infrastructure 30. Thereafter, the process flow at the time of entrance ends.

When the determination result of Step S5 is NO, the control ECU 34 determines whether a temporary holding area 6 is available (Step S9). In Step S9, it is determined whether the temporary holding area 6 is available based on the recognized parking status of the automatic valet parking lot 1. When the determination result of Step S9 is NO, the control ECU 34 determines whether another reservable parking area 5a is available (Step S10). In Step S10, it is determined whether another reservable parking area 5a is available based on the recognized parking status of the automatic valet parking lot 1.

When the determination result of Step S10 is NO, the vehicle ECU 48 performs parking control such that the vehicle V is parked outside the automatic valet parking lot 1, and causes the vehicle V to wait outside the automatic valet parking lot 1 (Step S11). In Step S11, parking control is performed such that the vehicle V is parked outside the automatic valet parking lot 1 based on the map information of the navigation device mounted in the vehicle V or the like. After Step S11, the process flow returns to Step S5.

When the determination result of Step S9 is YES, the control ECU 34 and the vehicle ECU 48 set the temporary holding area 6 as a temporary parking area and perform parking control such that the vehicle V is parked in the temporary parking area (Step S21). After parking of the vehicle V in the temporary parking area has been completed, it is determined whether the reserved parking area 5c is available (Steps S22 and S23). Completion of parking of the vehicle V can be determined, for example, based on the map data of the automatic valet parking lot 1, the position information of the vehicle V, and the result of detection from the inside sensor 32. In Step S23, it is determined whether the reserved parking area 5c is available based on the recognized parking status of the automatic valet parking lot 1.

When the determination result of Step S23 is NO, it is determined whether the reserved parking area 5c is available. When the determination result of Step S23 is YES, the control ECU 34 and the vehicle ECU 48 perform parking control such that the vehicle V is parked in the reserved parking area 5c (Step S24). After entrance of the vehicle V into the reserved parking area 5c has been completed, the server 20, the control ECU 34, and the vehicle ECU 48 set the vehicle V to exit holding (Steps S25 and S26). Thereafter, the process flow at the time of entrance ends.

When the determination result of Step S10 is YES, the control ECU 34 and the vehicle ECU 48 set another reservable parking area 5a as a temporary parking area, and perform parking control such that the vehicle V is parked in the temporary parking area (Step S30). After parking of the vehicle V in the temporary parking area has been completed, it is determined whether the reserved parking area 5c is available (Steps S31 and S32). In Step S32, it is determined whether the reserved parking area 5c is available based on the recognized parking status of the automatic valet parking lot 1.

When the determination result of Step S32 is YES, the process flow progresses to Step S24. When the determination result of Step S32 is NO, the control ECU 34 determines whether another vehicle which has reserved an entrance time for the temporary parking area has arrived at the automatic valet parking lot 1 (Step S33). In Step S33, it is determined whether the other vehicle has arrived at the automatic valet parking lot 1 by determining whether the other vehicle has arrived at the alighting area 2 based on the result of detection from the inside sensor 32 or the like. When the determination result of Step S33 is NO, the process flow returns to Step S32. When the determination result of Step S33 is YES, the process flow returns to Step S9. The case in which the determination result of Step S33 is NO includes a case in which there is no other vehicle which has reserved an entrance time for the temporary parking area.

Figure 5:
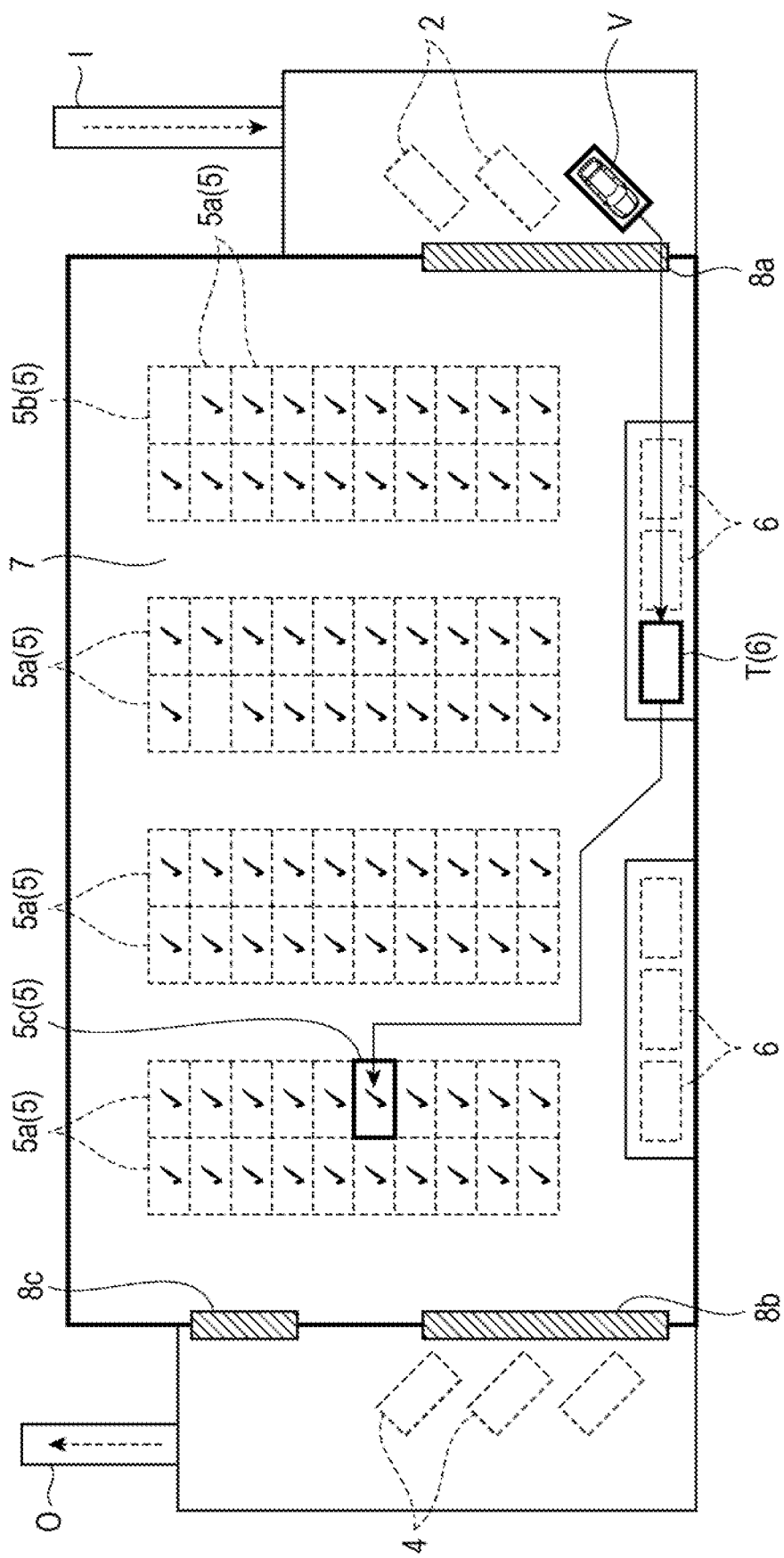
FIG. 5 is a schematic diagram of an automatic valet parking lot illustrating an example of a scenario of entrance with the parking control device.

FIG. 5 is a schematic diagram of an automatic valet parking lot 1 illustrating an example of a scenario of entrance with the parking control device 100. In the example illustrated in FIG. 5, a vehicle V arrives early at the automatic valet parking lot 1 and a difference time between the arrival time of the vehicle V and the reserved entrance time is equal to or less than a predetermined time. When the vehicle V has arrived early, another vehicle is parked in the reserved parking area 5c and the vehicle V cannot be parked in the reserved parking area 5c. Other vehicles are parked in all of the other reservable parking areas 5a (a full state).

In this case, when an occupant who has alighted from the vehicle V in the alighting area 2 performs an operation input for starting entrance using the operation terminal 10, parking control is performed such that the vehicle V is parked in a temporary parking area T which is a temporary holding area 6. Thereafter, when the reserved parking area 5c becomes empty (available), parking control is performed such that the vehicle V is parked in the reserved parking area 5c.

Figure 6:
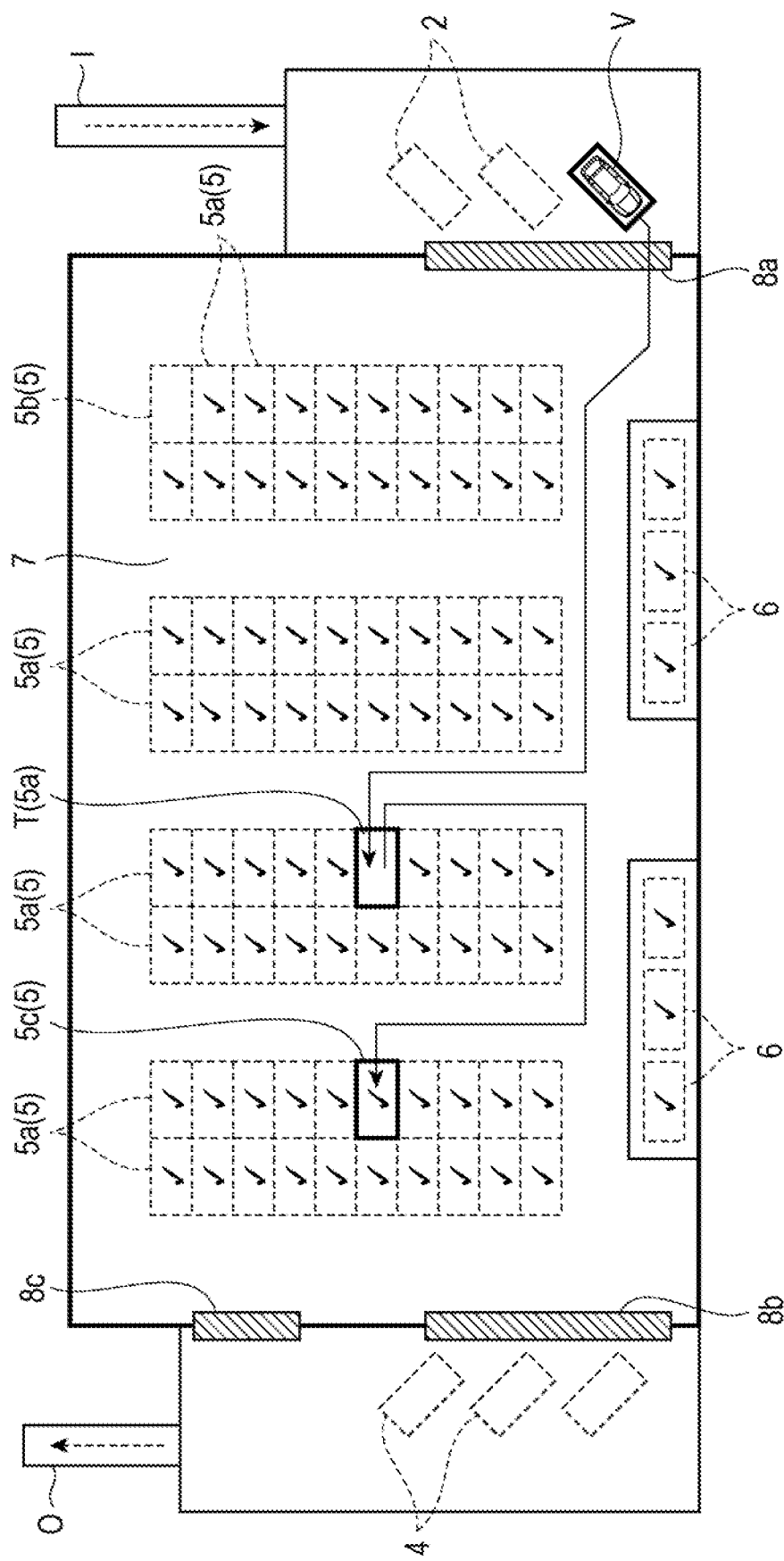
FIG. 6 is a schematic diagram of an automatic valet parking lot illustrating another example of a scenario of entrance with the parking control device.

FIG. 6 is a schematic diagram of an automatic valet parking lot 1 illustrating another example of a scenario of entrance with the parking control device 100. In the example illustrated in FIG. 6, a vehicle V arrives early at the automatic valet parking lot 1 and a difference time between the arrival time of the vehicle V and the reserved entrance time is equal to or less than a predetermined time. When the vehicle V has arrived early, another vehicle is parked in the reserved parking area 5c and the vehicle V cannot be parked in the reserved parking area 5c. Other vehicles are parked in all the temporary holding areas 6.

In this case, when an occupant who has alighted from the vehicle V in the alighting area 2 performs an operation input for starting entrance using the operation terminal 10, parking control is performed such that the vehicle V is parked in a temporary parking area T which is a reservable parking area 5a. Thereafter, when the reserved parking area 5c becomes empty, parking control is performed such that the vehicle V is parked in the reserved parking area 5c.

Figure 7:
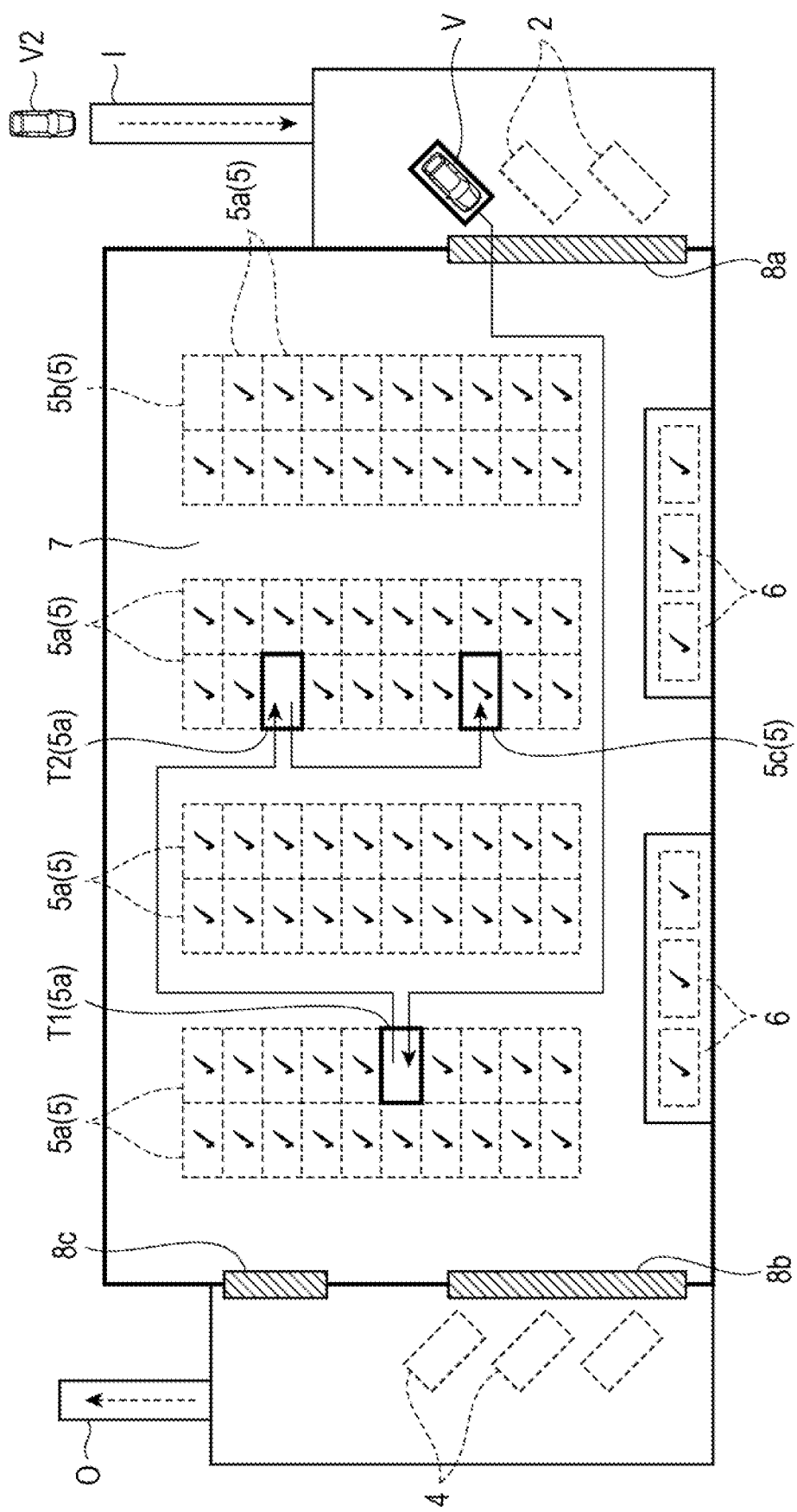
FIG. 7 is a schematic diagram of an automatic valet parking lot illustrating still another example of a scenario of entrance with the parking control device.

FIG. 7 is a schematic diagram of an automatic valet parking lot 1 illustrating still another example of a scenario of entrance with the parking control device 100. In the example illustrated in FIG. 7, a vehicle V arrives early at the automatic valet parking lot 1 and a difference time between the arrival time of the vehicle V and the reserved entrance time is equal to or less than a predetermined time. When the vehicle V has arrived early, another vehicle is parked in the reserved parking area 5c and the vehicle V cannot be parked in the reserved parking area 5c. Other vehicles are parked in all the temporary holding areas 6.

In this case, when an occupant who has alighted from the vehicle V in the alighting area 2 performs an operation input for starting entrance using the operation terminal 10, parking control is performed such that the vehicle V is parked in a temporary parking area T1 which is a reservable parking area 5a. There is another vehicle V2 which has reserved an entrance time in the temporary parking area T1 which is a reservable parking area 5a. Accordingly, when the other vehicle V2 has arrived at the automatic valet parking lot 1, parking control is performed such that the vehicle V is parked in a temporary parking area T2 which is another reservable parking area 5a. Thereafter, when the reserved parking area 5c becomes empty, parking control is performed such that the vehicle V is parked in the reserved parking area 5c.

In the above-mentioned parking control device 100, a vehicle V which has arrived early at the automatic valet parking lot 1 and which cannot be parked in a reserved parking area 5c can be parked in a temporary parking area T, T1, or T2 when the temporary parking area T, T1, or T2 is available. Accordingly, it is possible to prevent a vehicle V from waiting without being able to park until a reserved entrance time.

In the parking control device 100, the temporary parking area T, T1, or T2 may be a reservable parking area 5a. Accordingly, a reservable parking area 5a can be used as the temporary parking area T, T1, or T2.

In the parking control device 100, after the vehicle V has been parked in the temporary parking area T1, it is determined whether another temporary parking area T2 is available when the reserved parking area 5c is not available and another vehicle V2 which has reserved an entrance time for the temporary parking area T1 has arrived at the automatic valet parking lot 1, and parking control is performed such that the vehicle V moves to the other temporary parking area T2 when it is determined that the other temporary parking area T2 is available. Accordingly, it is possible to prevent interference with parking of the other vehicle V2 in the reservable parking area 5a which is used as the temporary parking area T1.

In the parking control device 100, when a reservable parking area 5a which has not been reserved is used as the temporary parking area T, T1, or T2 and at least one of the above-mentioned conditions (1) to (3) is satisfied, an entrance time thereof is set to be reservable. Accordingly, even when a parking area 5 is used as a temporary parking area T, T1, or T2, an entrance time thereof can be reserved.

In the parking control device 100, a temporary parking area T, T1, or T2 may be a temporary holding area 6. Accordingly, a temporary holding area 6 such as a dead space in the automatic valet parking lot 1 can be used as a temporary parking area T, T1, or T2.

In the parking control device 100, a temporary holding area 6 is set as a temporary parking area T, T1, or T2 when the temporary holding area 6 is available, and a reservable parking area 5a is set as a temporary parking area T, T1, or T2 when the temporary holding area 6 is not available and the reservable parking area 5a is available. Accordingly, the temporary holding area 6 using a dead space or the like can be preferentially used as a temporary parking area T, T1, or T2. The reservable parking area 5a can be secured as a parking area for parking another vehicle.

In the parking control device 100, it is determined whether the reserved parking area 5c is available after the vehicle V has been parked in the temporary parking area T, T1, or T2, and parking control is performed such that the vehicle V moves from the temporary parking area T, T1, or T2 to the reserved parking area 5c when it is determined that the reserved parking area 5c is available. Accordingly, for example, in comparison with a case in which a reserved parking area 5c which is available is used as a temporary parking area for another vehicle, it is possible to prevent the vehicle V or another vehicle from frequently moving and to perform efficient parking control.

In the parking control device 100, when a vehicle V has arrived at the automatic valet parking lot 1 before a reserved entrance time and a difference time between the arrival time at which the vehicle V has arrived and the reserved entrance time is equal to or less than a predetermined time, parking control is set to be performed such that the vehicle V is parked in a temporary parking area. Accordingly, it is possible to prevent the vehicle V from being parked in the automatic valet parking lot 1 regardless of a reserved entrance time. For example, a vehicle V which has arrived at the automatic valet parking lot 1 much earlier than the reserved entrance time can be prevented from being parked in the automatic valet parking lot 1. It is possible to curb difficulty in managing a parking schedule.

Figure 8:
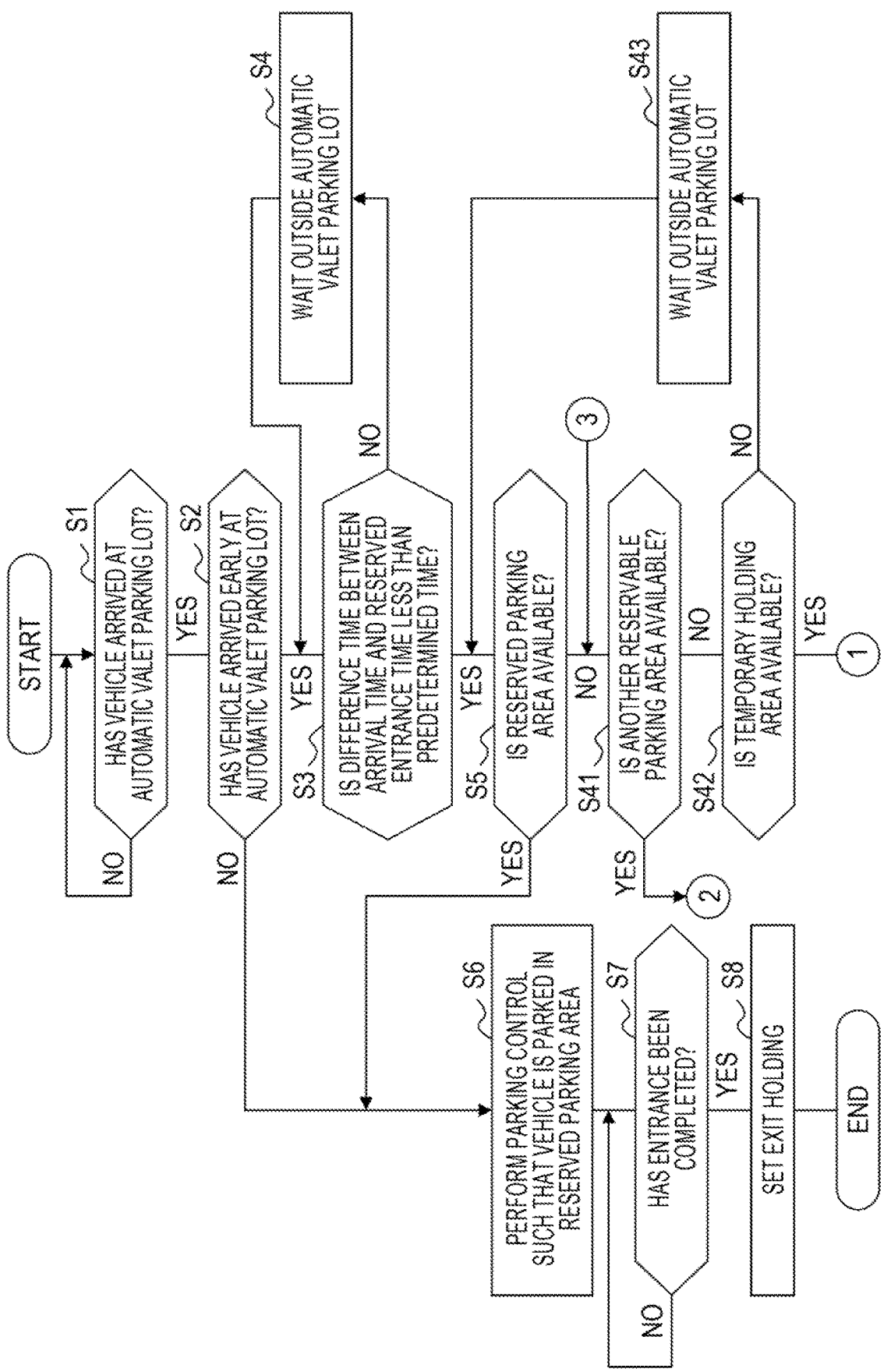
FIG. 8 is a flowchart illustrating a process flow which is performed by a parking control device according to a modified example.

FIG. 8 is a flowchart illustrating a process flow which is performed by a parking control device according to a modified example. As illustrated in FIG. 8, a process flow which is performed by a parking control device according to a modified example is different from the process flow which is performed by the parking control device 100 (see FIG. 3) in that the processing order of Steps S9 and S10 is reversed. That is, in the process flow of the parking control device according to the modified example, Step S41 is performed instead of Step S9 (see FIG. 3) and Step S42 is performed instead of Step S10 (see FIG. 3).

In Step S41, the control ECU 34 determines whether another reservable parking area 5*a* is available. In Step S41, it is determined whether another reservable parking area 5*a* is available based on the recognized parking status of the automatic valet parking lot 1. In Step S42, the control ECU 34 determines whether a temporary holding area 6 is available. In Step S42, it is determined whether a temporary holding area 6 is available based on the recognized parking status of the automatic valet parking lot 1. When the determination result of Step S42 is NO, the vehicle ECU 48 performs parking control such that the vehicle V is parked outside the automatic valet parking lot 1, and causes the vehicle V to wait outside the automatic valet parking lot 1 (Step S43).

In the parking control device according to the modified example, the same operational advantages as described above can be achieved. In the parking control device according to the modified example, a reservable parking area 5*a* is set as a temporary parking area when the reservable parking area 5*a* is available, and a temporary holding area 6 is set as a temporary parking area when the reservable parking area 5*a* is not available and the temporary holding area 6 is available. Accordingly, the reservable parking area 5*a* can be preferentially used as a temporary parking area T, T1, or T2. The temporary holding area 6 can be secured as, for example, an emergency refuge area.

While various exemplary embodiments have been described above, the disclosure is not limited to the exemplary embodiments and can be subjected to various omissions, substitutions, and modifications.

In the above-mentioned embodiment, an area for which an entrance time is not set to be reservable is not limited to a temporary holding area 6. An area for which an entrance time is not set to be reservable may be, for example, an area constituting a part of the traveling route 7 as long as it is an area which is available in the automatic valet parking lot 1. In the above-mentioned embodiment, at least one of a reservable parking area 5*a* and a temporary holding area 6 is used as a temporary parking area T, T1, or T2, but an unreservable parking area 5*b* may be used as a temporary parking area T, T1, or T2 instead of or in addition to them.

What is claimed is:

1. A parking control system configured to perform automated parking control of a vehicle, comprising:
the vehicle, wherein the vehicle includes a vehicle electronic control unit (ECU);
a plurality of vehicle sensors configured to detect a traveling state of the vehicle, the traveling state including a speed of the vehicle, an acceleration of the vehicle, and a yaw rate around a vertical axis at a center of gravity of the vehicle;
a global positioning system (GPS) configured to acquire position information of the vehicle including latitude and longitude of a current position of the vehicle;
a database configured to store map data of a parking lot and a use history of a plurality of vehicles, the use history including information on previously executed traveling routes for each of the plurality of vehicles; and
a control electronic control unit (ECU) programmed to:
determine whether the reserved parking area is available when the vehicle arrives at the parking lot before an entrance time reserved for the reserved parking area, the reserved parking area being a parking area for which the entrance time has been reserved in the parking lot including a plurality of parking areas,
determine whether the temporary parking area, which is an area other than the reserved parking area, is available when it is determined that the reserved parking area is not available,
set an entrance time for a parking area for which the entrance time is set to be reservable in the parking lot and has not been reserved when a condition that other parking areas of the plurality of parking areas for which an entrance time is set to be reservable in the parking lot have been reserved and a time period from a current time to an earliest time of exit times which are reserved for the other parking areas of the plurality of parking areas is less than a predetermined time is satisfied while the parking area is set as the temporary parking area,
wherein, based upon the determination that the temporary parking area is available and the entrance time is set, the vehicle ECU is further programmed to:
create a traveling route for the vehicle based on the traveling state of the vehicle, the position information of the vehicle, the map data, and the use history of the vehicle, and
control the vehicle to move along the traveling route and to automatically park in the temporary parking area.

2. The parking control system according to claim 1, wherein the temporary parking area is an area for which an entrance time is set to be reservable in the parking lot.

3. The parking control system according to claim 2, wherein the control ECU is further programmed to determine whether another temporary parking area which is another parking area other than the reserved parking area and the temporary parking area is available when the reserved parking area is not available and another vehicle having reserved an entrance time for the temporary parking area arrives at the parking lot after the vehicle has been parked in the temporary parking area, and control the vehicle to move from the current position to the other temporary parking area and park the vehicle in the other temporary parking area when it is determined that the other temporary parking area is available.

4. The parking control system according to claim 1, wherein the temporary parking area is an area for which an entrance time is not set to be reservable in the parking lot.

5. The parking control system according to claim 1, wherein the control ECU is further programmed to set the parking area for which an entrance time is set to be reservable in the parking lot as the temporary parking area when the parking area for which an entrance time is set to be reservable in the parking lot is available, and set an area for which an entrance time is not set to be reservable in the parking lot as the temporary parking area when the parking area for which an entrance time is set to be reservable in the parking lot is not available and the area for which an entrance time is not set to be reservable in the parking lot is available.

6. The parking control system according to claim 1, wherein the control ECU is further programed to set an area for which an entrance time is not set to be reservable in the parking lot as the temporary parking area when the area for which an entrance time is not set to be reservable in the parking lot is available, and set the parking area for which an entrance time is set to be reservable in the parking lot as the temporary parking area when the area for which an entrance time is not set to be reservable in the parking lot is not available and the parking area for which an entrance time is set to be reservable in the parking lot is available.

7. The parking control system according to claim 1, wherein the control ECU is further programmed to determine whether the reserved parking area is available after the vehicle has been parked in the temporary parking area, and the vehicle ECU is further programmed to control the vehicle to automatically move from the temporary parking area to the reserved parking area and park the vehicle in the reserved parking area when it is determined that the reserved parking area is available.

8. The parking control system according to claim 1, wherein the vehicle ECU is further programmed to control the vehicle to automatically move from the current position to the temporary parking area and park the vehicle in the temporary parking area when the vehicle arrives at the parking lot before the entrance time reserved for the reserved parking area and when a difference between an arrival time at which the vehicle arrives at the parking lot and the entrance time is equal to or less than a second predetermined time.

* * * * *